(12) United States Patent
Cui et al.

(10) Patent No.: US 10,265,792 B2
(45) Date of Patent: *Apr. 23, 2019

(54) SINTER-BONDED HYBRID ARTICLE, METHOD FOR FORMING HYBRID ARTICLE, AND METHOD FOR CLOSING APERTURE

(71) Applicant: GENERAL ELECTRIC COMPANY, Schenectady, NY (US)

(72) Inventors: Yan Cui, Greer, SC (US); Srikanth Chandrudu Kottilingam, Simpsonville, SC (US); Brian Lee Tollison, Honea Path, SC (US); Timothy Neal Pletcher, Greenwood, SC (US); Richard Ryan Pilson, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,565

(22) Filed: Nov. 8, 2017

(65) Prior Publication Data

US 2018/0065203 A1 Mar. 8, 2018

Related U.S. Application Data (63) Continuation-in-part of application No. 15/621,606, filed on Jun. 13, 2017, now Pat. No. 10,035,329,
(Continued)

(51) Int. Cl.
*B23K 1/00* (2006.01)
*B22F 7/06* (2006.01)
(Continued)

(52) U.S. Cl.
CPC ............ *B23K 1/0018* (2013.01); *B22F 5/009* (2013.01); *B22F 5/04* (2013.01); *B22F 7/062* (2013.01);
(Continued)

(58) Field of Classification Search
CPC ........ B23K 1/0018; B23K 9/04; B23K 10/27; B23K 35/36; B23K 35/0222;
(Continued)

(56) References Cited

U.S. PATENT DOCUMENTS

| 4,314,007 A * | 2/1982 | Gessinger | B22D 19/00 |
| | | | 29/889.71 |
| 6,464,128 B1 * | 10/2002 | Messelling | B23K 35/0244 |
| | | | 164/92.1 |
| 2013/0086785 A1 * | 4/2013 | Cui | B32B 15/01 |
| | | | 29/402.18 |

FOREIGN PATENT DOCUMENTS

| EP | 1197290 A2 | 4/2002 |
| EP | 1226896 A2 | 7/2002 |

(Continued)

OTHER PUBLICATIONS

EPO Search Report, dated May 5, 2017, 8 pages.

*Primary Examiner* — Michael Bernshteyn
(74) *Attorney, Agent, or Firm* — McNees Wallace & Nurick LLC (57) ABSTRACT

A hybrid article is disclosed including a coating disposed on and circumscribing the lateral surface of a core having a core material. The coating includes about 35% to about 95% of a first metallic material having a first melting point, and about 5% to about 65% of a second metallic material having a second melting point lower than the first melting point. The coating is sinter-bonded to the core. A method for forming the hybrid article is disclosed including disposing the core in a die, introducing a slurry having the metallic materials into a gap between the lateral surface and the die, and sintering the slurry, forming the coating. A method for closing an aperture of an article is disclosed including inserting the hybrid article into the aperture, and brazing the hybrid article (Continued)

to the article, welding the aperture with the hybrid article serving as weld filler, or both.

20 Claims, 4 Drawing Sheets

Related U.S. Application Data which is a continuation-in-part of application No. 14/966,788, filed on Dec. 11, 2015, now Pat. No. 9,862,046.

(51) Int. Cl.
| | |
|---|---|
| B22F 5/04 | (2006.01) |
| B23F 5/00 | (2006.01) |
| B23K 9/04 | (2006.01) |
| B23K 15/00 | (2006.01) |
| B23K 35/36 | (2006.01) |
| B23K 35/02 | (2006.01) |
| B32B 15/01 | (2006.01) |
| C23C 30/00 | (2006.01) |
| B22F 5/00 | (2006.01) |
| B23K 10/02 | (2006.01) |
| B23K 26/34 | (2014.01) |
| F01D 5/14 | (2006.01) |
| F01D 5/28 | (2006.01) |
| B22F 7/04 | (2006.01) |
| B23K 101/00 | (2006.01) |

(52) U.S. Cl.
CPC .............. *B23K 9/04* (2013.01); *B23K 10/027* (2013.01); *B23K 15/0086* (2013.01); *B23K 26/34* (2013.01); *B23K 35/0222* (2013.01); *B23K 35/0227* (2013.01); *B23K 35/0255* (2013.01); *B23K 35/0261* (2013.01); *B23K 35/0272* (2013.01); *B23K 35/36* (2013.01); *B32B 15/01* (2013.01); *C23C 30/00* (2013.01); *F01D 5/147* (2013.01); *F01D 5/288* (2013.01); *B22F 2007/047* (2013.01); *B22F 2007/068* (2013.01); *B22F 2303/20* (2013.01); *B23K 2101/001* (2018.08)

(58) Field of Classification Search
CPC ............ B23K 35/0227; B23K 35/0255; B23K 35/0261; B23K 35/0272; B23K 26/34; B22F 7/062; B22F 5/04; B22F 5/009; B32B 15/01
USPC ....................................................... 428/680
See application file for complete search history.

(56) References Cited

FOREIGN PATENT DOCUMENTS

| EP | 1197290 A3 | 5/2003 |
|---|---|---|
| EP | 1226896 A3 | 5/2004 |

\* cited by examiner

SINTER-BONDED HYBRID ARTICLE, METHOD FOR FORMING HYBRID ARTICLE, AND METHOD FOR CLOSING APERTURE

CROSS REFERENCE TO RELATED APPLICATIONS

This application relates to and claims the benefit of U.S. patent application Ser. No. 14/966,788, filed Dec. 11, 2015, entitled "Hybrid Article, Method for Forming Hybrid Article and Method for Closing Aperture," now U.S. Pat. No. 9,862,046, and U.S. patent application Ser. No. 15/621,606, filed Jun. 13, 2017, entitled "Hybrid Article, Method for Forming Hybrid Article, and Method for Closing Aperture," now U.S. Pat. No. 10,035,329, the disclosures of which are incorporated by reference in their entirety.

FIELD OF THE INVENTION

The present invention is directed to hybrid articles, methods for forming hybrid articles, and methods for closing apertures. More particularly, the present invention is directed to hybrid articles, methods for forming hybrid articles, and methods for closing apertures with the hybrid articles wherein the hybrid articles include a core having a core material and a coating having two metallic materials with different melting points, and the coating is sinter-bonded to the core.

BACKGROUND OF THE INVENTION

Hard-to-weld (HTW) alloys, such as nickel-based superalloys and certain aluminum-titanium alloys, due to their gamma prime and various geometric constraints, are susceptible to gamma prime strain aging, liquation and hot cracking. These materials are also difficult to join when the gamma prime phase is present in volume fractions greater than about 30%, which may occur when aluminum or titanium content exceeds about 3%. As used herein, an "HTW alloy" is an alloy which exhibits liquation, hot and strain-age cracking, and which is therefore impractical to weld.

These HTW alloys may be incorporated into components of gas turbine engines such as airfoils, blades (buckets), nozzles (vanes), shrouds, combustors, rotating turbine components, wheels, seals, 3d-manufactured components with HTW alloys and other hot gas path components. Incorporation of these HTW alloys may be desirable due to often superior operational properties, particularly for certain components subjected to the most extreme conditions and stresses.

Manufacturing processes and repairs of components incorporating HTW alloys, such as the closing of apertures left open during casting processes, is difficult to achieve using standard techniques, as these techniques may damage the HTW alloys or introduce materials which would be weakened or cracked by the elevated temperatures to which the components are subjected to. By way of example, typical brazing techniques are unsuitable because typical braze materials or elements are incorporated into the component which may not meet operational requirements.

BRIEF DESCRIPTION OF THE INVENTION

In an exemplary embodiment, a hybrid article includes a core and a coating. The core includes a lateral surface, and a core material. The coating is disposed on and circumscribes the lateral surface. The coating includes about 35% to about 95% of a first metallic material having a first melting point, and about 5% to about 65% of a second metallic material having a second melting point. The first melting point is higher than the second melting point. The coating is sinter-bonded to the core.

In another exemplary embodiment, a method for forming a hybrid article includes disposing a core in a die. The core includes a lateral surface. A gap is formed between the lateral surface and the die. The gap circumscribes the lateral surface. A slurry is introduced into the gap. The slurry includes a first metallic material having a first melting point, and a second metallic material having a second melting point. The first melting point is higher than the second melting point. The lateral surface is coated with the slurry. The slurry is sintered to form a coating circumscribing the lateral surface, forming the hybrid article. The coating includes about 35% to about 95% of the first metallic material and about 5% to about 65% of the second metallic material. The coating is sinter-bonded to the core.

In another exemplary embodiment, a method for closing an aperture of an article includes inserting a hybrid article into the aperture. The hybrid article includes a core and a coating. The core includes a lateral surface and a core material. The coating is disposed on and circumscribes the lateral surface. The coating includes about 35% to about 95% of a first metallic material having a first melting point, and about 5% to about 65% of a second metallic material having a second melting point. The first melting point is higher than the second melting point. The coating is sinter-bonded to the core. The aperture is closed. Closing the aperture includes a technique selected from the group consisting of brazing the hybrid article to the article, welding the aperture with the hybrid article serving as a weld filler, and combinations thereof.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary hybrid articles, methods for forming hybrid articles and methods for closing apertures. Embodiments of the present disclosure, in comparison to articles and methods not utilizing one or more features disclosed herein, decrease costs, increase process control, increase reparability, improve mechanical properties, improve elevated temperature performance, increase weldability, or a combination thereof.

Referring to FIG. 1-12, in one embodiment, a hybrid article 100 includes a core 102 and a coating 104. The core 102 includes a lateral surface 106, and a core material 108. The coating 104 is disposed on the lateral surface 106. The coating 104 includes a first metallic material 110 and a second metallic material 112. The coating 104 is sinter-bonded to the core 102.

Figure 1:
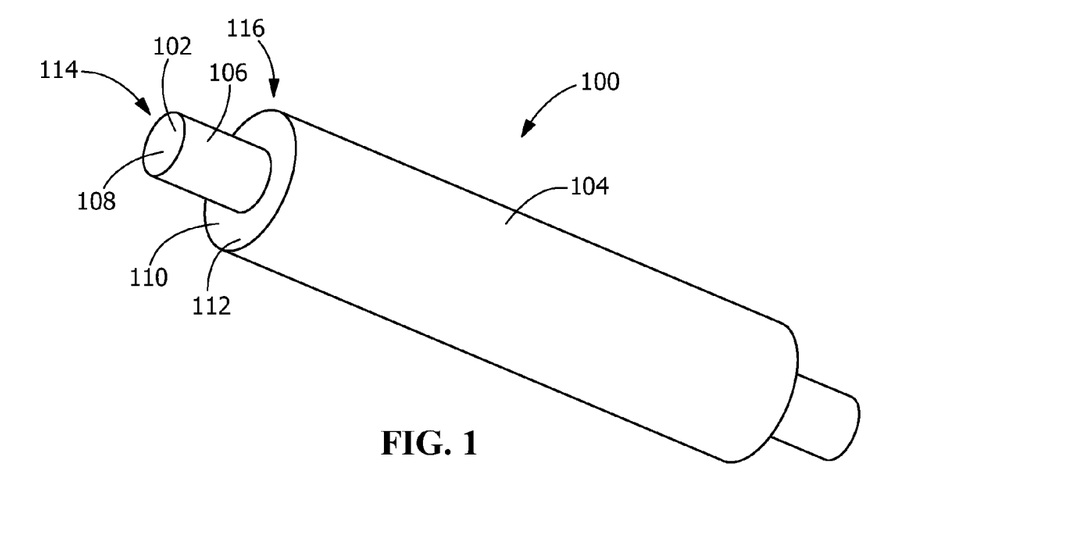
FIG. 1 is a perspective view of a hybrid article, according to an embodiment of the present disclosure.

In one embodiment, the hybrid article 100 is free of gaps between the lateral surface 106 and the coating 104. As used herein, "free of gaps" indicates that any clearance between the lateral surface 106 and the coating 104 is less than about 5 µm, alternatively less than about 1 µm, alternatively less than about 0.1 µm, and further that any such clearance is limited in area to less than 5% of the interface between the lateral surface 106 and the coating 104, alternatively less than about 1%, alternatively less than about 0.1%.

The hybrid article 100 may include any suitable length along the core 102, including, but not limited to, a length of at least about 50 mm, alternatively at least about 75 mm, alternatively at least about 100 mm, alternatively at least about 125 mm, alternatively at least about 150 mm, alternatively at least about 175 mm, alternatively at least about 200 mm, alternatively at least about 250 mm, alternatively at least about 300 mm, alternatively at least about 350 mm, alternatively at least about 400 mm, alternatively at least about 450 mm, alternatively at least about 500 mm, alternatively at least about 750 mm, alternatively at least about 1 m, alternatively at least about 1.5 m, alternatively at least about 2 m, alternatively at least about 2.5 m, alternatively at least about 5 m, alternatively at least about 10 m.

In one embodiment, the core 102 includes an average core diameter of from about 0.25 mm to about 50 mm, alternatively from about 0.5 mm to about 30 mm, alternatively from about 0.5 mm to about 15 mm, alternatively from about 0.5 mm to about 5 mm, alternatively from about 0.5 mm to about 3 mm, alternatively from about 1 mm to about 2 mm.

The core 102 may include any suitable ratio of length along the core 102 to core diameter, including, but not limited to, a ratio of at least about 1:1, alternatively at least about 2:1, alternatively at least about 3:1, alternatively at least about 4:1, alternatively at least about 5:1, alternatively at least about 10:1, alternatively at least about 25:1.

In another embodiment, the coating 104 includes an average coating thickness of from about 0.1 mm to about 15 mm, alternatively from about 0.25 mm to about 10 mm, alternatively from about 0.5 mm to about 5 mm, alternatively from about 0.5 mm to about 2.5 mm, alternatively from about 0.5 mm to about 2 mm, alternatively from about 0.5 mm to about 1 mm.

Figure 3:
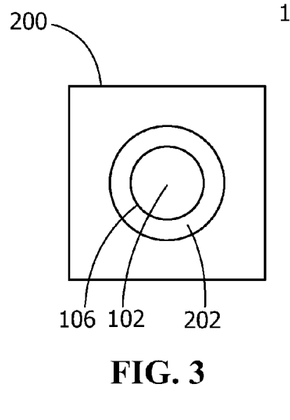
FIG. 3 is a sectional view along lines 3-3 of the core and die of FIG. 2, according to an embodiment of the present disclosure.

The hybrid article 100 may include any suitable article cross-sectional conformation 114, including, but not limited to, a circle (shown), an ellipse, an oval, a triangle, a rounded triangle, a square, a rounded square, a rectangle, a rounded rectangle, a pentagon, a rounded pentagon, a hexagon, a rounded hexagon, or a combination thereof. The core 102 may include any suitable core cross-sectional conformation 116, including, but not limited to, a circle (shown), an ellipse, an oval, a triangle, a rounded triangle, a square, a rounded square, a rectangle, a rounded rectangle, a pentagon, a rounded pentagon, a hexagon, a rounded hexagon, or a combination thereof. The article cross-sectional conformation 114 may be the same conformation as the core cross-sectional conformation 116 or a different conformation. In one embodiment, the core 102 is a wire. In a further embodiment, the core 102 is an electrically conductive wire.

The coating 104 may include any suitable amount of the first metallic material 110 and the second metallic material 112. In one embodiment, the coating includes about 35% to about 95% of the first metallic material, alternatively about 45% to about 85% of the first metallic material, alternatively about 35% to about 55% of the first metallic material, alternatively about 55% to about 75% of the first metallic material, alternatively about 75% to about 95% of the first metallic material. In another embodiment, the coating includes about 5% to about 65% of the second metallic material, alternatively, about 15% to about 55% of the second metallic material, alternatively about 55% to about 25% of the second metallic material, alternatively about 25% to about 45% of the second metallic material, alternatively about 45% to about 65% of the second metallic material. In a further embodiment, the coating 104 consists essentially of the first metallic material 110 and the second metallic material 112, excluding impurities forming less than about 3% of the coating 104, alternatively less than about 2% of the coating 104, alternatively less than about 1% of the coating 104.

In one embodiment, the first metallic material 110 includes a first melting point, and the second metallic material 112 includes a second melting point, wherein the first melting point is higher than the second melting point. The first melting point may be from about 2,380° F. to about 2,700° F., alternatively from about 2,400° F. to about 2,600° F., alternatively from about 2,450° F. to about 2,550° F., alternatively from about 2,475° F. to about 2,525° F. The second melting point may be from about 1,400° F. to about 2,375° F., alternatively from about 1,450° F. to about 2,300° F., alternatively from about 1,500° F. to about 2,200° F., alternatively from about 1,550° F. to about 2,150° F., alternatively from about 1,600° F. to about 2,100° F.

The core material 108 may be any suitable material, including, but not limited to, a superalloy, a nickel-based superalloy, a cobalt-based superalloy, an iron-based superalloy, a hard-to-weld (HTW) alloy, a refractory alloy, GTD 111, GTD 444, HAYNES 188, HAYNES 230, INCONEL 738, MAR-M-247, René 108, René 142, René 195, René N2, or a combination thereof.

The first metallic material 110 may be any suitable material, including, but not limited to, a superalloy, a nickel-based superalloy, a cobalt-based superalloy, an iron-based superalloy, a hard-to-weld (HTW) alloy, a refractory alloy, GTD 111, GTD 444, HAYNES 188, HAYNES 230, INCONEL 738, MAR-M-247, René 108, René 142, René 195, René N2, or a combination thereof. The first metallic material 110 may be the same material as the core material 108 or a different material.

The second metallic material 112 may be any suitable material, including, but not limited to, a braze alloy, DF-4B, BNi-2, BNi-5 (AMS 4782), BNi-9, or a combination thereof.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

As used herein, "BNi-2" refers to an alloy including a composition, by weight, of about 3% iron, about 3.1% boron, about 4.5% silicon, about 7% chromium, and a balance of nickel.

As used herein, "BNi-5" and "AMS 4782" refer to an alloy including a composition, by weight, of about 10% silicon, about 19% chromium, and a balance of nickel.

As used herein, "BNi-9" refers to an alloy including a composition, by weight, of about 15% chromium, about 3% boron, and a balance of nickel.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "HAYNES 230" refers to an alloy including a composition, by weight, of about 22% chromium, about 2% molybdenum, about 0.5% manganese, about 0.4% silicon, about 14% tungsten, about 0.3% aluminum, about 0.1% carbon, about 0.02% lanthanum, and a balance of nickel.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

Figure 2:
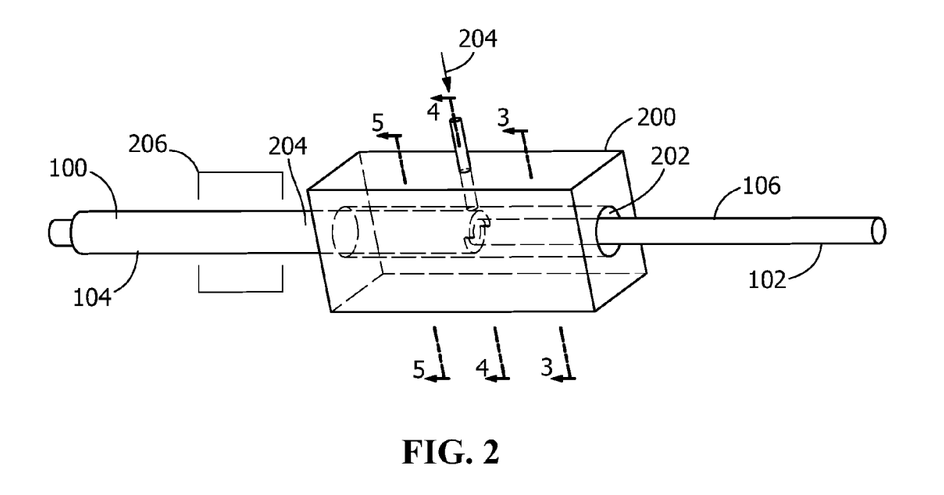
FIG. 2 is a schematic view of the formation of a hybrid article, according to an embodiment of the present disclosure.
Figure 4:
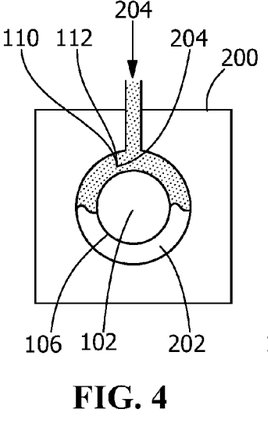
FIG. 4 is a sectional view along lines 4-4 of the core, die, and slurry of FIG. 2, according to an embodiment of the present disclosure.
Figure 5:
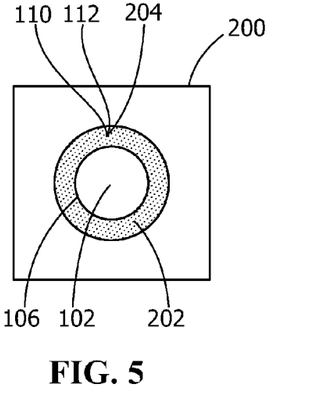
FIG. 5 is a sectional view along lines 5-5 of the core, die, and slurry of FIG. 2, according to an embodiment of the present disclosure.

Referring to FIG. 2, in one embodiment, a method for forming the hybrid article 100, includes disposing the core 102 in a die 200. Referring to FIGS. 2 and 3, a gap 202 is formed between the lateral surface 106 and the die 200, and the gap 202 circumscribes the lateral surface 106. Referring to FIGS. 2 and 4, a slurry 204 is introduced into the gap 202, the slurry 204 including the first metallic material 110 and the second metallic material 112, and coating the lateral surface 106. Referring to FIGS. 2 and 5, the slurry 204 circumscribes the lateral surface 106. Referring again to FIG. 2 the slurry 204 is sintered to form the coating 104 circumscribing the lateral surface 106, forming the hybrid article 100. The slurry 204 may include a binder gel. In one embodiment, the slurry 204 includes a viscosity sufficient to adhere to the core 102 until the slurry 204 is sintered to form the coating 104.

Sintering the slurry 204 to form the coating 104 may include heating the slurry 204 with a heating element 206. The heating element 206 may be any suitable heating element, including, but not limited to, an oven. In one embodiment, heating the slurry 204 includes heating the slurry 204 to a sintering temperature. The sintering temperature may be any suitable temperature, including, but not limited to, a sintering temperature of from about 1,500° F. to about 2,375° F., alternatively from about 1,600° F. to about 2,350° F., alternatively from about 1,700° F. to about 2,325° F., alternatively from about 1,800° F. to about 2,300° F., alternatively from about 1,850° F. to about 2,250° F. In another embodiment, heating the slurry 204 to the sintering temperature includes maintaining the slurry 204 at the sintering temperature for a sintering duration. The sintering duration may be any suitable duration, including, but not limited to, a duration of from about 5 minutes to about 150 minutes, alternatively from about 10 minutes to about 120 minutes, alternatively from about 15 minutes to about 90 minutes. Sintering the slurry 204 to form the coating 104 may include heating the slurry 204 under air, under inert gas, under vacuum, or a combination thereof.

In one embodiment, the core 102 is passed through the die 200. Passing the core 102 through the die 200 may be a continuous process. In a further embodiment, the die 200 is part of a coating apparatus for the production of a welding electrode, such as, but not limited to, a shielded metal arc welding electrode. In another embodiment, the die 200 is a component of an extrusion press.

In one embodiment, the slurry 204 is introduced under elevated pressure. As used herein, "elevated pressure" indicates a pressure greater than atmospheric pressure external to the die 200. The elevated pressures may be any suitable pressure, including, but not limited to, a pressure sufficient to fully coat the lateral surface 106 with the slurry 204 as the core 102 passes through the die 200.

The hybrid article 100 may be finished by any suitable finishing technique, including, but not limited to, heating, polishing, brushing, tip cleaning, sizing, chemically treating, or a combination thereof. Sizing the hybrid article 100 may include removing at least one portion of the hybrid article 100 to reduce the length of the hybrid article 100 to a predetermined length. The predetermined length may be any suitable length. Removing at least one portion of the hybrid article 100 may include severing the at least one portion of the hybrid article 100 at any suitable angle with respect to the length of the hybrid article 100, including, but not limited to, an orthogonal angle or an angle matching the surface of an article into which the hybrid article 100 is to be inserted.

Figure 6:
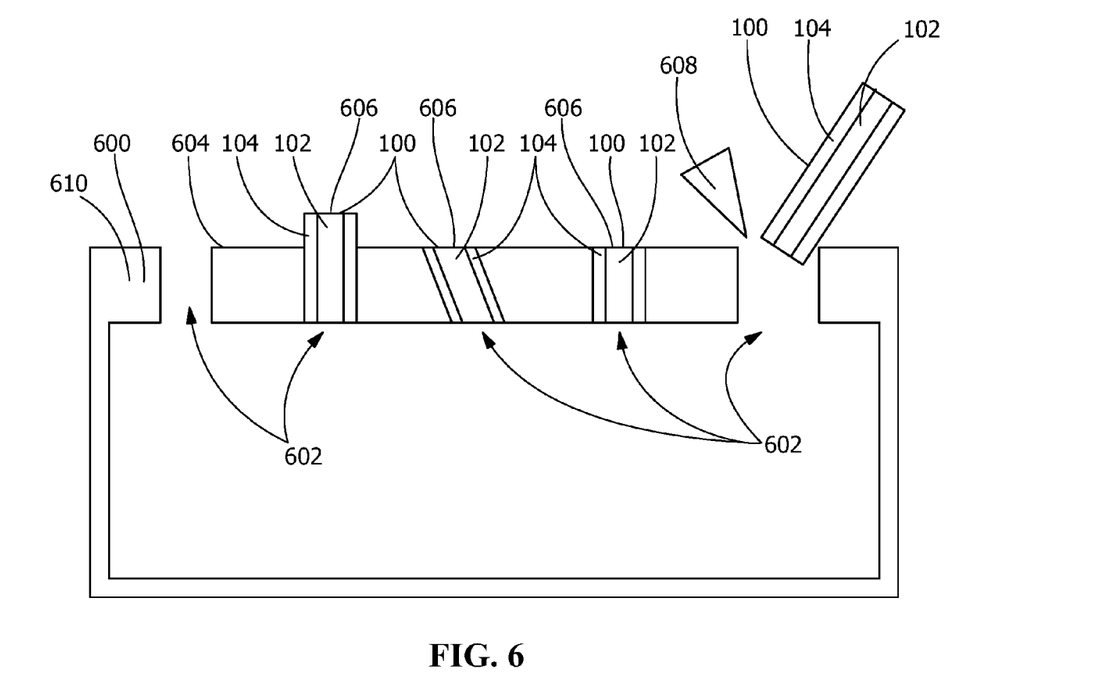
FIG. 6 is a sectional view of an article and hybrid articles, according to an embodiment of the present disclosure.

Referring to FIG. 6, in one embodiment, a method for closing an aperture 602 of an article 600 includes inserting the hybrid article 100 into the aperture 602, and closing the aperture 602. Closing the aperture 602 includes brazing the hybrid article 100 to the article 600, welding the aperture 602 with the hybrid article 100 serving as a weld filler, or a combination thereof.

Closing the aperture 602 may form a hermetic seal between the aperture 602 and the core 102. In one embodiment, when the aperture 602 is closed, the terminus 604 of the hybrid article 100 is about even with the surface 606 of the article 600. In another embodiment, when the aperture 602 is closed, the terminus 604 is divergent from the surface 606 of the article 600. As used herein, "about even" indicates that the terminus 604 is less than 0.3 mm removed from the surface 606 of the article 600, and "divergent" indicates that the terminus 604 is at least 0.3 mm removed from the surface 606 of the article 600.

In one embodiment, the article 600 is a turbine component. The article 600 may be any suitable turbine component, including, but not limited to, a hot gas path component, an airfoil, a bucket (blade), a nozzle (vane), a shroud, a combustor, or a combination thereof.

In one embodiment, brazing the hybrid article 100 to the article 600 includes brazing the hybrid article 100 to a hard-to-weld (HTW) alloy. In another embodiment, welding the aperture 602 includes employing a welding apparatus 608 to perform a welding technique. The welding technique may be any suitable welding technique, including, but not limited to, gas tungsten arc welding, shielded metal arc welding, plasma arc welding, laser beam welding, electron beam welding, or a combination thereof.

The hybrid article 100 may be used as a weld filler for any suitable welding application which uses a welding technique incorporating a weld filler. Suitable welding applications include, but are not limited to, closing apertures in superalloy components, closing apertures in HTW alloy components, filling cavities in superalloy components, filling cavities in HTW alloy components, repairing superalloy components, repairing HTW alloy components, joining a first component and a second component, wherein at least one of the first component and the second component includes a superalloy, joining a first component and a second component, wherein at least one of the first component and the second component includes an HTW alloy, or a combination thereof. The welding technique may include, but is not limited to, gas metal arc welding, gas tungsten arc welding, shielded metal arc welding, plasma arc welding, laser beam welding, electron beam welding, or a combination thereof.

In one embodiment, the core material 108 of the hybrid article 100 includes the same material composition as a substrate material 610 of the article 600 which defines the aperture 602. In another embodiment, the core material 108 of the hybrid article 100 includes a material composition distinct from the substrate material 610 of the article 600 which defines the aperture 602. In this context, the core material 108 includes the same material composition as the substrate material 610 if the material composition is about the same and any variations are insufficient to have a material effect on the properties of the material, whereas the core material 108 of the hybrid article 100 includes a material composition distinct from the substrate material 610 if the material composition is not about the same or if the variations establish a material effect on the properties of the material.

Referring to FIG. 7-12, in one embodiment the core 102 is a hollow core 700 including a channel 702 disposed within the lateral surface 106. The channel 702 may run the entire length of the hollow core 700, or may run a length less than the entire length of the hollow core 700. In one embodiment, the channel 702 is in an open state, in which the channel 702 is open at both ends. In another embodiment, the channel 702 is in a semi-open state, in which the channel 702 is open at one end and closed at the other end. In yet another embodiment, the channel 702 is in a closed state, in which the channel 702 is closed at both ends.

Figure 7:
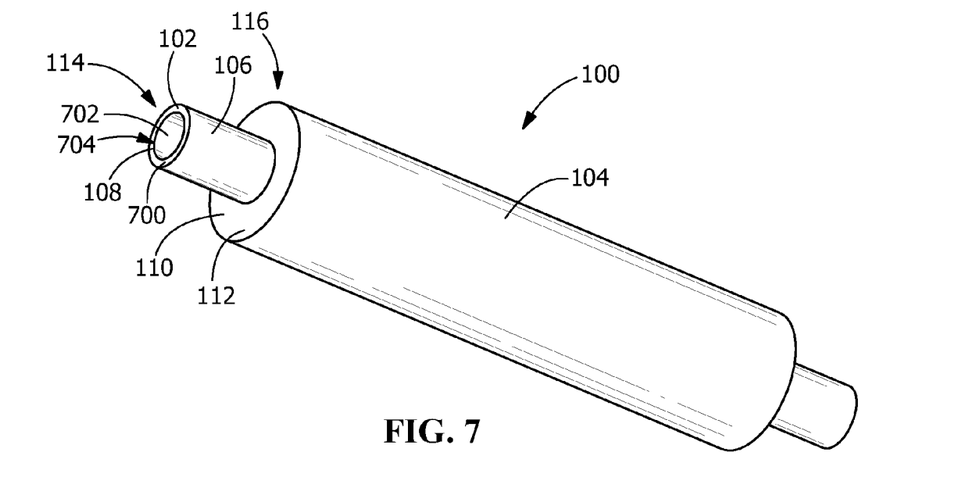
FIG. 7 is a perspective view of a hybrid article having a hollow core, according to an embodiment of the present disclosure.
Figure 8:
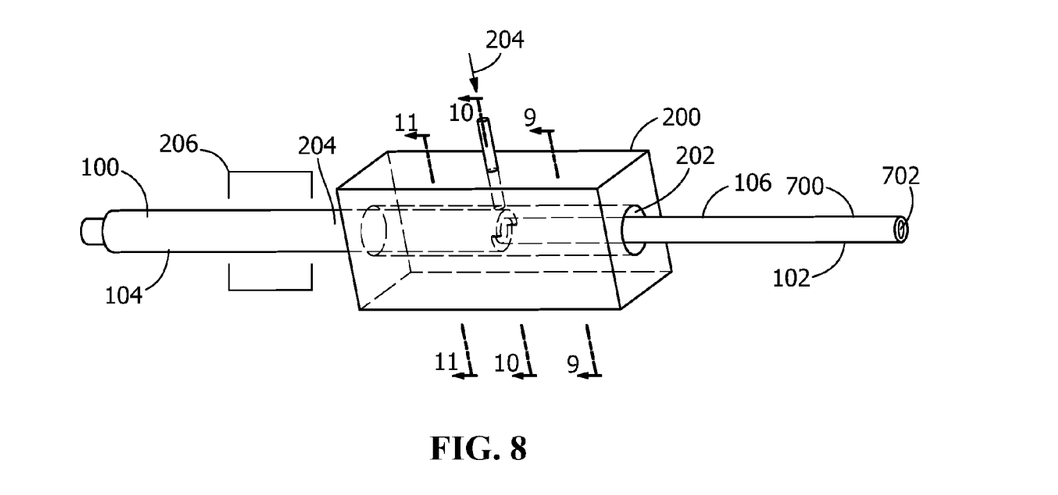
FIG. 8 is a schematic view of the formation of a hybrid article having a hollow core, according to an embodiment of the present disclosure.

In one embodiment, the channel 702 includes an average channel diameter of from about 0.2 mm to about 45 mm, alternatively from about 0.4 mm to about 29 mm, alternatively from about 0.4 mm to about 14 mm, alternatively from about 0.4 mm to about 4.9 mm, alternatively from about 0.4 mm to about 2.9 mm, alternatively from about 0.9 mm to about 1.9 mm.

The average core diameter and the average channel diameter define an average wall thickness for the hollow core 700. The average wall thickness may be any suitable thickness, including, but not limited to, a wall thickness of between about 0.1 mm and about 10 mm, alternatively between about 0.2 mm and about 5 mm, alternatively between about 0.5 mm and about 2 mm.

Figures 9, 10:
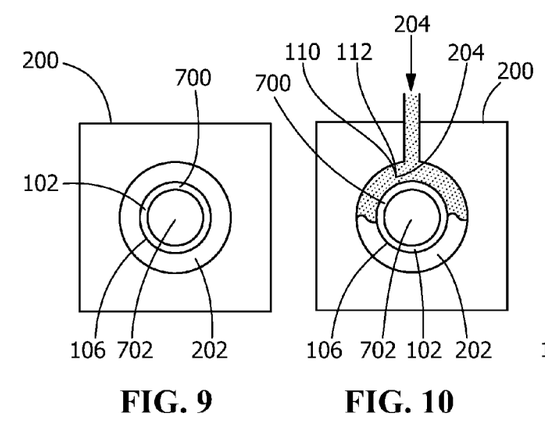
FIG. 9 is a sectional view along lines 9-9 of the hollow core and die of FIG. 8, according to an embodiment of the present disclosure.
FIG. 10 is a sectional view along lines 10-10 of the hollow core, die, and slurry of FIG. 8, according to an embodiment of the present disclosure.
Figure 11:
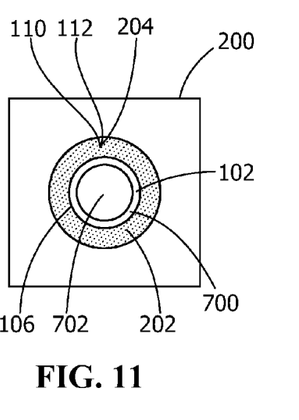
FIG. 11 is a sectional view along lines 11-11 of the hollow core, die, and slurry of FIG. 8, according to an embodiment of the present disclosure.

The channel 702 may include any suitable channel cross-sectional conformation 704, including, but not limited to, a circle (shown), an ellipse, an oval, a triangle, a rounded triangle, a square, a rounded square, a rectangle, a rounded rectangle, a pentagon, a rounded pentagon, a hexagon, a rounded hexagon, or a combination thereof. The core cross-sectional conformation 116 may be the same conformation as the channel cross-sectional conformation 704 or a different conformation. The article cross-sectional conformation 114 may be the same conformation as the channel cross-sectional conformation 704 or a different conformation. In one embodiment, the hollow core 700 is a tube. In a further embodiment, the hollow core 700 is an electrically conductive tube.

Figure 12:
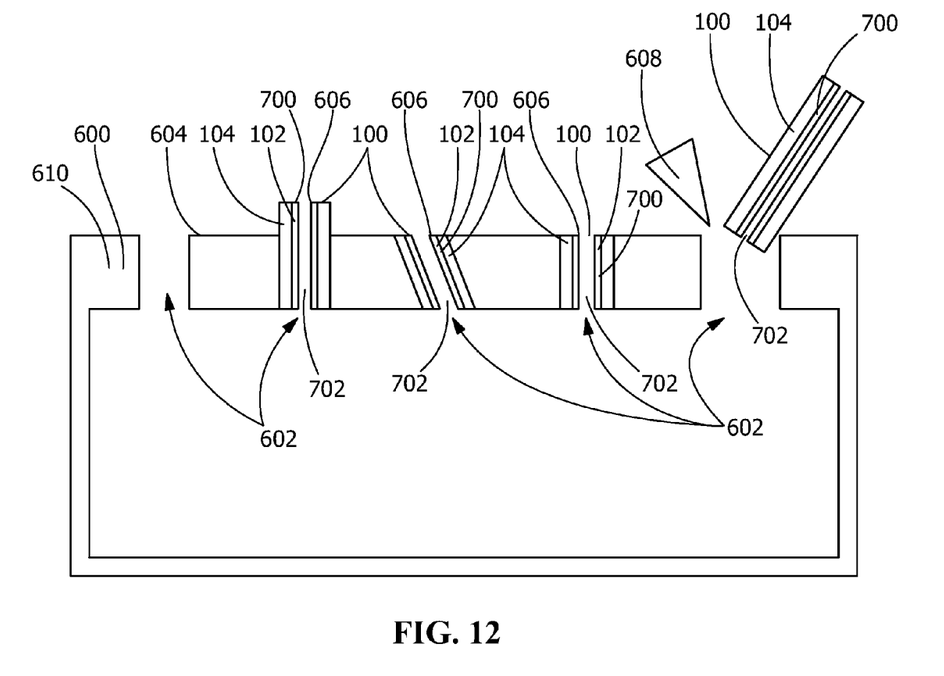
FIG. 12 is a sectional view of an article and hybrid articles having hollow cores, according to an embodiment of the present disclosure.

Referring to FIG. 12, in one embodiment, the channel 702 is in an open state prior to closing the aperture 602, is maintained in the open state while closing the aperture 602, and remains in an open state following closing the aperture 602. In another embodiment, the channel 702 is in a semi-open state prior to closing the aperture 602, is maintained in the semi-open state while closing the aperture 602, and is modified to an open state following closing the aperture 602. Modifying the channel 702 to an open state may include any suitable technique, including, but not limited to, machining the channel 702, drilling the channel 702, laser-drilling the channel 702, or combinations thereof. In one embodiment, the channel 702 is in a closed state prior to closing the aperture 602, is maintained in the closed state while closing the aperture 602, and is modified to an open state following closing the aperture 602. In one embodiment, the channel 702 being maintained in the open state during the closing of the aperture 602 or following the closing of the aperture 602 facilitates at least one of purging air from an internal cavity of the article 600, inspecting an internal cavity of the article 600, and exhausting debris or contaminants from an internal cavity of the article 600. Following a suitable period of time after the closing of the aperture 602, the channel 702 may be modified to a sealed state by any suitable technique.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid article, comprising:
   a core including a lateral surface and a core material; and
   a coating disposed on and circumscribing the lateral surface, the coating including about 35% to about 95% of a first metallic material having a first melting point, and about 5% to about 65% of a second metallic material having a second melting point, the first melting point being higher than the second melting point,
   wherein the coating is sinter-bonded to the core.

2. The hybrid article of claim 1, wherein the hybrid article is free of gaps between the lateral surface and the coating.

3. The hybrid article of claim 1, wherein the hybrid article includes a length along the core of at least about 50 mm.

4. The hybrid article of claim 1, wherein the core is a hollow core including a channel disposed within the lateral surface.

5. The hybrid article of claim 1, wherein the core material and the first material are independently selected from the group consisting of at least one a superalloy, a nickel-based superalloy, a cobalt-based superalloy, an iron-based superalloy, a hard-to-weld (HTW) alloy, a refractory alloy, GTD 111, GTD 444, HAYNES 188, INCONEL 738, MAR-M-247, René 108, René 142, René 195, and René N2.

6. The hybrid article of claim 1, wherein the coating further includes an average coating thickness of from about 0.5 mm to about 5 mm, and the core further includes an average diameter of from about 0.5 mm to about 30 mm.

7. The hybrid article of claim 1, further including an article cross-sectional conformation and a core cross-sectional conformation independently selected from the group consisting of a circle, an ellipse, an oval, a triangle, a rounded triangle, a square, a rounded square, a rectangle, a rounded rectangle, a pentagon, a rounded pentagon, a hexagon, a rounded hexagon, and combinations thereof.

8. A method for forming a hybrid article, comprising:
   disposing a core in a die, the core including a lateral surface;
   forming a gap between the lateral surface and the die, the gap circumscribing the lateral surface;
   introducing a slurry into the gap, the slurry including a first metallic material having a first melting point, and a second metallic material having a second melting point, the first melting point being higher than the second melting point;
   coating the lateral surface with the slurry; and
   sintering the slurry to form a coating circumscribing the lateral surface, forming the hybrid article, the coating including about 35% to about 95% of the first metallic material and about 5% to about 65% of the second metallic material,
   wherein the coating is sinter-bonded to the core.

9. The method of claim 8, wherein the hybrid article is free of gaps between the lateral surface and the coating.

10. The method of claim 8, wherein the hybrid article includes a length along the core of at least about 50 mm.

11. The method of claim 8, wherein the core is a hollow core including a channel disposed within the lateral surface.

12. The method of claim 8, wherein disposing the core in the die includes passing the core through the die in a continuous process.

13. The method of claim 8, further including sizing the hybrid article to a predetermined length.

14. A method for closing an aperture of an article, comprising:
   inserting a hybrid article into the aperture, the hybrid article including:
      a core including a lateral surface and a core material, and
      a coating disposed on and circumscribing the lateral surface, the coating including about 35% to about 95% of a first metallic material having a first melting point, and about 5% to about 65% of a second metallic material having a second melting point, the first melting point being higher than the second melting point,
      wherein the coating is sinter-bonded to the core; and
   closing the aperture, closing the aperture including a technique selected from the group consisting of brazing the hybrid article to the article, welding the aperture with the hybrid article serving as a weld filler, and combinations thereof.

15. The method of claim 14, wherein the hybrid article is free of gaps between the lateral surface and the coating.

16. The method of claim 14, wherein the hybrid article includes a length along the core of at least about 50 mm.

17. The method of claim 14, wherein the core is a hollow core including a channel disposed within the lateral surface.

18. The method of claim 14, wherein closing the aperture includes welding the aperture with the hybrid article serving as the weld filler to a hard-to-weld (HTW) alloy of the article.

19. The method of claim 14, wherein closing the aperture includes brazing the hybrid article to the article.

20. The method of claim 14, wherein inserting the hybrid article into the aperture includes inserting the hybrid article into a turbine component.

* * * * *